Sept. 22, 1959 G. E. ARMINGTON 2,904,905
ALL WHEEL DRIVE SCRAPER
Filed Sept. 14, 1954 3 Sheets-Sheet 1

INVENTOR.
GEORGE E. ARMINGTON
BY
ATTORNEYS

Sept. 22, 1959 G. E. ARMINGTON 2,904,905
ALL WHEEL DRIVE SCRAPER

Filed Sept. 14, 1954 3 Sheets-Sheet 3

INVENTOR.
GEORGE E. ARMINGTON
BY
Hyde, Meyer, Baldwin & Doran
ATTORNEYS

United States Patent Office 2,904,905
Patented Sept. 22, 1959

2,904,905

ALL WHEEL DRIVE SCRAPER

George E. Armington, Gates Mills, Ohio, assignor to General Motors Corporation, Detroit, Mich., a corporation of Delaware Application September 14, 1954, Serial No. 455,883

29 Claims. (Cl. 37—126)

This invention relates to improvements in a vehicle and more particularly to an all wheel drive digging and carrying scraper.

One of the objects of the present invention is to provide a self-powered, all wheel drive, digging and carrying scraper.

A further object of the present invention is to provide a self-powered all wheel drive digging and carrying scraper or other vehicle wherein (1) a single motor drives both front and rear wheels with the drive occurring through an articulated frame construction for permitting wheel driving while raising or lowering the scraper bowl, (2) one pair of supporting wheels is steerable about a generally vertical steering axis with the drive to said wheels extending down through the steering axis to permit sharp turning without materially affecting the drive, (3) one pair of supporting wheels is mounted for oscillation about a generally horizontal axis to permit travel over uneven earth with the drive to these wheels having a universal joint means approximately aligned with the wheel steering axis to permit the oscillation, and/or (4) a single motor for driving all of the wheels is located behind the rear wheels with the scraper operator located adjacent to the front wheels with controls for steering the scraper and controlling the motor.

A further object of the present invention is to provide a four-wheel drive digging and carrying scraper or other vehicle with one pair of steered and driven wheels and another pair of driven wheels with means responsive to the steering action of the steered wheels for reducing the drive on the other pair of wheels during sharp steering so that steering will properly occur without excessive side skidding of the steered wheels.

A further object of the present invention is to provide a torque proportioning means operatively connected between a driving motor and the driven front and rear wheels of an all-wheel drive digging and carrying scraper or vehicle with this torque proportioning means dividing the torque applied to each pair of wheels in a definite, predetermined ratio.

A further object of the present invention is to provide a planetary transmission or a planetary type, two-speed, gear shift transmission especially adapted for coacting with the torque proportioning means mentioned in the preceding paragraph.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 3 is an enlarged, longitudinal section through the torque proportioning means and the two-speed planetary gear shift drivingly connected between the propelling motor and each pair of driven wheels and located immediately behind the scraper bowl;

Fig. 4 is a vertical sectional view taken along the line 4—4 of Fig. 2 through the steering axis; while

While the present invention might be applied to various types of vehicles and might be used for many other purposes, I have chosen to show the same as applied to a digging and carrying scraper. The scraper operation as to the manner and means for raising and lowering the bowl, raising and lowering the ejector, and raising and lowering the scraper bowl apron is similar to that shown in the copending U.S. patent application Serial No. 287,772, entitled "Digging and Carrying Scraper," filed by E. R. Fryer and W. J. Adams on May 14, 1952, and isued on December 11, 1956 as United States Patent No. 2,773,320.

Figure 1:
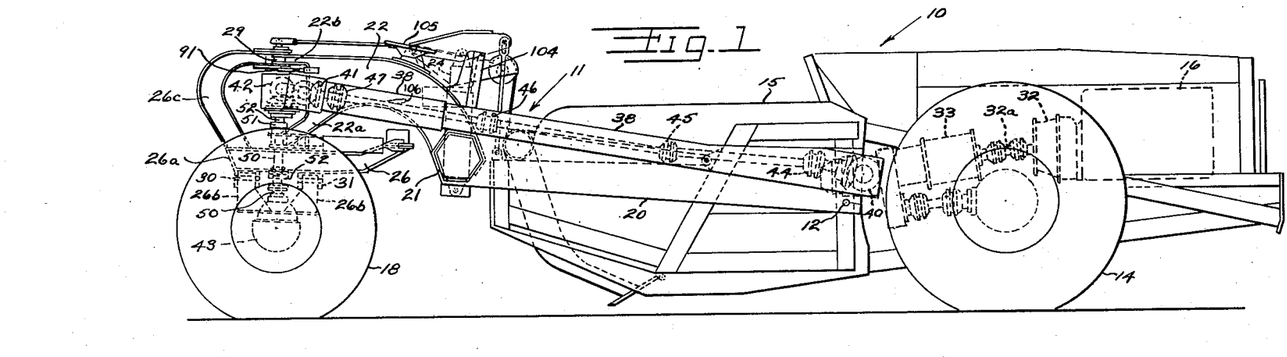
Fig. 1 is a side elevational view of an all-wheel drive, self-powered digging and carrying scraper of the present invention.

The self-powered, four-wheel drive digging and carrying scraper in Fig. 1 of the present application includes a rear frame member 10 and a front frame member 11 pivotally connected together by pivots 12, 12 about a horizontal pivotal axis. Scraper frame members 10, 11 are respectively supported by wheel pairs 14, 18 to provide rear and front wheels.

The rear frame member 10 has rigidly secured thereon the scraper bowl 15 located between the pairs of wheels 14, 18 and a single motor 16 driving all of the wheels and located behind the rear wheels 14 for at least partially counterbalancing the bowl 15. The motor 16 is located at the rear to keep a majority of the weight on the rear wheels 14. During difficult loading of material, it is sometimes necessary to have a tractor push the scraper to assist in getting a load quickly. This often tends to lift the rear end of the scraper upwardly. Having the motor 16 at the rear adds weight on the rear wheels 14 and improves the traction when loading in this manner.

The front frame member 11 has rearwardly extending, parallel arms 20, 20 straddling the scraper bowl 15 with each pivotally connected thereto by one of the pivots 12 near the rear of the bowl 15. These arms 20 are connected at their forward ends by a torque tube 21 to which is secured an upwardly and forwardly extending gooseneck arch 22 operatively connected to the front wheel pair 18 at its forward end.

Means is provided for operatively connecting the frame members 10 and 11 together for relative movement therebetween for raising and lowering bowl 15. Consideration of the aforementioned copending patent application will reveal that the expansion or contraction of the two outermost fluid pressure actuated jacks 24, 24 in Figs. 1 and 2 will respectively raise or lower the bowl 15 by causing relative movement between the frame members 10, 11 about the aligned pivots 12, 12 by pivoting the rear frame member 10 clockwise or counterclockwise about the axle connecting the rear wheel pair 14.

Figure 4:
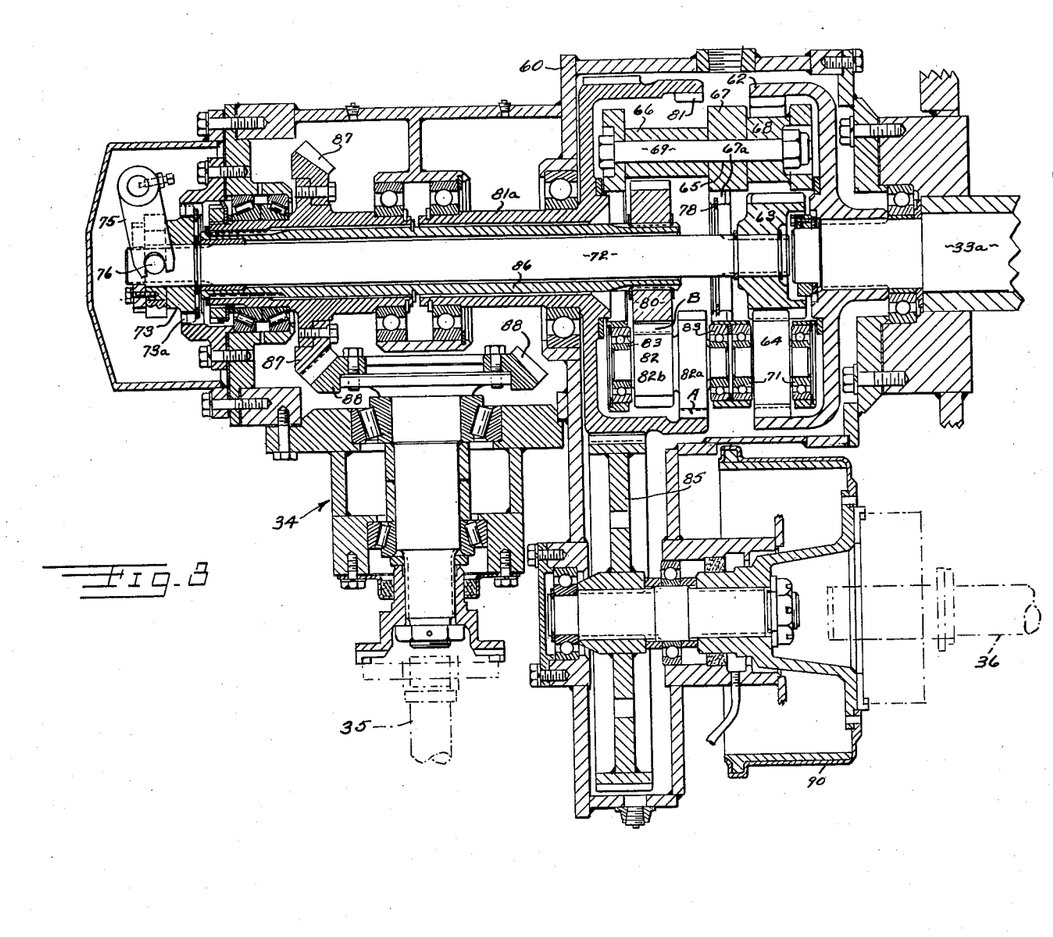

The scraper is steered by having one of the wheel pairs suitably mounted for steering with this taking the form of the front wheel pair 18 in the present disclosure. The steering mounting of wheels 18 takes the form in the present application of that disclosed in my copending U.S. Patent application, Serial No. 407,743, filed February 2, 1954 and entitled "Power Steering Apparatus for Sharp Turning" controlled in the manner disclosed in my copending U.S. patent application Serial No. 455,882, filed September 14, 1954, and entitled "Two Speed Steering." In Fig. 1 of the present application, steering subframe 26 is pivotally connected about a generally vertical steering axis 27 to the front frame member 11 so as to mount the front wheel pair 18 for steering. This steering subframe 26 is fluid pressure actuated for steering in basically the same manner as disclosed in the aforementioned copending U.S. patent application "Power Steering Apparatus for Sharp Turning." This steering subframe 26 includes an upper part 26a having rigidly connected to its leading portion a forwardly arched and upwardly extending arm 26c and having operatively connected to its lower portion a lower part 26b having the front wheel pair 18 secured thereto so that all of the subframe parts turn together about the steering axis 27 during steering. The steering subframe 26 is pivotally secured to the front frame member 11 for pivotal movement about the steering axis 27 by pivot members, comprising lower sleeve bearing 28 in Fig. 4 and upper pivot pin 29 in Fig. 1, axially aligned and spaced apart to pivotally connect forwardly protruding arms 22a and 22b of the gooseneck arch 22 and the steering subframe upper part 26a and the upper end of the subframe arm 26c respectively. This construction provides a clearance gap vertically between the aligned pivot members 28, 29 for a purpose to be brought out more in detail hereinafter. This structure provides a rigid connection between the parts without requiring a large bulky construction.

The subframe upper and lower parts 26a and 26b are pivotally connected together to permit travel of the wheels 18 over uneven earth so that all four wheels will always be on the ground. Here, the pivotal connection between the parts 26a, 26b takes the form of aligned pins 30, 31 forming an axis of oscillation extending generally horizontally and generally fore and aft when the wheels 18 are in their straight ahead position so that part 26b and wheels 18 may oscillate about this axis during travel over uneven ground. This oscillation is limited by suitable coacting stops on parts 26a, 26b. These pivot pins 30, 31 are located between the pivotal steering connection provided by pivot members 28 and 29 and the front wheels 18 with the latter having their axle rigidly connected to the steering subframe part 26b so that the wheels 18 and the subframe 26 all turn together about the steering axis 27 during steering of the scraper.

It should be noted that the steering subframe 26 and the steering wheels 18, 18 extend under the upwardly and forwardly extending gooseneck arch 22 to provide adequate steering clearance to permit right angle steering of the front wheels 18 for maximum maneuverability. It should be noted that the front wheels 18 are closer together than the rear ones 14 so as to provide the following advantages: (1) the wheel base can be kept short and still provide wheel clearance space for 90° steering of the front wheels 18, (2) the gooseneck arch 22 has minimum longitudinal length to reduce the dead weight of the scraper and also provide a shorter turning radius by the shorter distance between the steering axis 27 and the axle of the rear wheels 14 (a higher and longer arch will be required for the gooseneck 22 to clear the front wheels 18 if they were moved farther apart), and (3) the difference in lateral spacing of the front and rear wheels eliminates rutting and provides more even compactness of fills, roads or other earth travelled over.

The disclosed self-powered, digging and carrying scraper has all four wheels 14, 18 driven by the motor or engine 16. This all-wheel drive is desirable during loading and travelling under adverse soil conditions. Motor 16 in Fig. 1 drives through fluid coupling or torque converter 32, a drive shaft 32a having universal joints at opposite ends, three speed transmission 33 to a combined two-spaced transmission and torque proportion means unit 34 in Figs. 1, 2 and 3 to provide power to output shafts 35, 36 for driving respectively the front wheels 18 and rear wheels 14. This unit 34 will be described in more detail hereinafter. The output shaft 36 is drivingly connected to transfer gears in housing 37 directly to the rear axle for driving the rear wheels, 14 with these transfer gears taking the form of a differential or any other suitable driving connection. The opposite ends of both shafts 35 and 36 have universal joints provided thereon to allow for any misalignment in the mounting of the unit 34.

Figure 2:
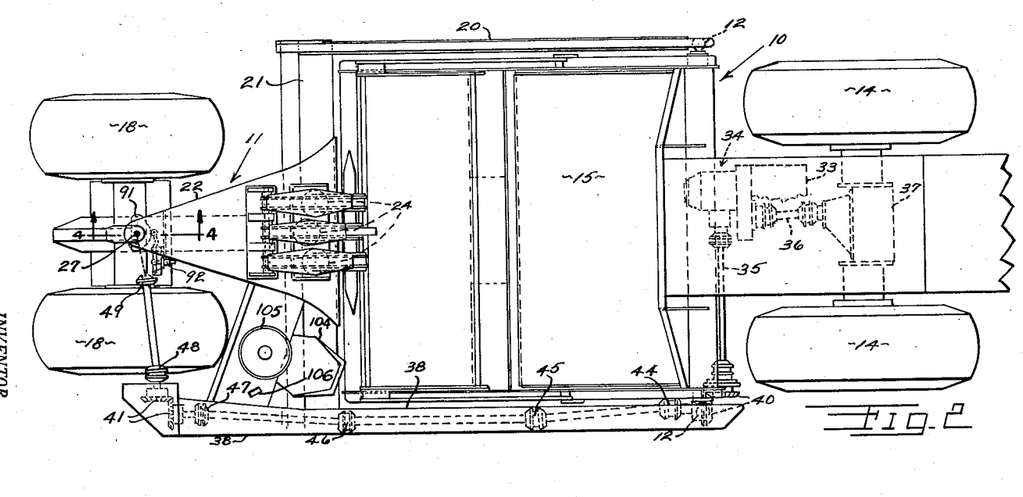
Fig. 2 is a top plan view of the digging and carrying scraper in Fig. 1 with parts omitted for clarity.

A drive line to the front wheels 18 is formed by the output shaft 35 extending generally transverse to the rear frame member 10 (downwardly in Fig. 2) into close proximity with the pivotal connection 12 between one of the arms 20 and the bowl 15; into a right angle gear box 40 having bevel gears; along the arm 20 (Figs. 1 and 2) and within a protecting housing 38 fixed to said arm; through said housing forwardly of the arm connection with torque tube 21 to a bevel gear drive 41 in Fig. 2 and to a bevel gear drive 42 in Fig. 1 mounted on the front of arch 22 within the clearance gap between the pivot members 28, 29; down through pivot member sleeve bearing 28 (Figs. 1 and 4); and along the steering axis 27 to drive the steering wheels 18 through transfer gears in housing 43 drivingly connected to the axle of the front wheels 18 in any suitable manner with these gears in housing 43, for example, taking the form of a differential drive. The drive line along the side of the scraper bowl 15 and over to steering axis 27 is provided with universal joints 44, 45, 46, 47, 48 and 49 connecting the different shaft portions with intermediate bearing supports at universal joints 45 and 46.

When the scraper bowl 15 is raised and lowered, the arms 20 pivot on the scraper bowl 15 at pivots 12 so that this movement causes relative motion between the gear box 40 and the unit 34. However, this motion is mostly rotational since the gear box 40 is in close proximity with the pivotal connection 12 so as to keep the universal joint angularity on opposite ends of the drive shaft 35 within operatable angles.

The vertical drive line to the front axle of wheels 18 coincides with the steering axis 27 to permit sharp turning. Here, the drive line has a drive line shaft portion 50 in Figs. 1 and 4 extending downwardly from the bevel gear box 42 along the steering axis 27 to differential 43 with the universal joint means 51, 52 operatively connecting portions of this shaft 50 to correct for any misalignment while bearing 53 rotatably supports the center portion of this shaft within the bore of the sleeve bearing 28 as it extends downwardly to this bore to reach differential housing 43. The universal joint means 52 is made up of upper and lower universal joints straddling and approximately aligned with the oscillation axis provided by pins 30, 31 to permit driving of the steering wheels 18 while oscillating during travel over uneven ground. Hence, this construction permits not only sharp turning up to 90° but also oscillation of the front wheels 18 without materially affecting the universal joint angles or affecting the drive of these wheels.

Hence, the motor 16 will drive the front wheels 18 through the different bevel gear boxes, universal joints and connecting drive shaft portions with this drive continually occurring even during the scraper bowl operation and steering of the vehicle. One or more axially spaced apart universal joints can be located at each universal joint mentioned while the gear drives 40, 41 and 42 have similar bevel gear driving arrangements in each. Each portion of the drive is suitably protected by housing 38 along the arm 20, sleeve 55 in Fig. 4, and the gear box housings. Endwise telescopically connected shaft sections can be provided wherever necessary if the particular driving shaft portion has any tendency to change in length during movement, for example, see the telescopic splined shaft sections above universal joint means 52 and below bearing 53 in Fig. 4.

The unit 34 in Figs. 1 and 2 is shown in more detail by the longitudinal section in Fig. 3 and includes a two-speed gear shift planetary type transmission connected through three speed transmissions 33 with the motor 16 to provide six driving speeds for the wheels. The unit 34 has a surrounding housing 60 rotatably supporting the output drive shaft 33a from transmission 33 and driven by the motor with this drive shaft 33a splined to a ring gear 62 drivingly connected to sun gear 63 by a plurality of arcuately spaced planet gears 64. These planet gears are rotatably supported in a rotatable spider 65 formed by cage members 66, 67 and 68 bolted together at arcuately spaced points by bolt and nut unit 69. Each planet gear pinion 64 is rotatably supported in the spider or cage 65 by spaced apart bearings 71, 71 rotatably supporting protruding stub shaft portions on the planet gear pinion 64 in cage members 67 and 68.

The power is transmitted from this planetary transmission to the planetary type torque proportioning means on the left thereof by means of the common cage or spider in both planetary systems. The torque proportioning means will be described in more detail hereinafter, but suffice it to say for the present that the motor 16 drives the input shaft 33a and the ring gear 62 while the output from the transmission is provided by the rotatable cage or spider 65.

A two-speed drive is provided by axially shifting the sun gear 63 to two different positions. In the position shown in Fig. 3, sun gear 63 meshes with planet gears 64 while the sun gear 63 is locked against relative rotation with respect to the frame or housing 60 so as to permit restrained rotation of the transmission planet gears 64 in the spider 65. The sun gear 63 is locked against endwise movement and against relative rotation by being straddled by snap rings and by being splined to axially shiftable shaft 72 with a ring 73 keyed onto the left end of said shaft and fixed against endwise and rotative movement thereon with said ring 73 having peripheral teeth 73a, for example, of gear tooth formation, axially detachably engaged with corresponding teeth on the unit housing 60 for keying against rotation. Hence, sun gear 63 cannot rotate relative to the housing 60 and therefore restrained rotation of the transmission planet gears 64 takes place in the cage or spider 65 so that the latter rotates in a predetermined ratio with respect to the drive applied thereto by the ring gear 62.

The shaft 72 can be shifted endwise to provide a second speed. Pivotally mounted shifter fork 75 is adapted to swing clockwise from the Fig. 3 position so as to move the shaft 72 axially toward the left by the pin 76 fixed to a collar rotatably mounted on but fixed against axial movement with respect to the shaft 72. This action disengages the teeth 73a so that the sun gear 63 is now free to rotate. However, upon disengagement of the teeth 73a, splined teeth 67a in the bore of the cage member 67 are engaged by the teeth of the sun gear 63 as the sun gear engages against the stop ring 78 carried in a groove in teeth 67a so as to key together the sun gear 63, the planetary cage or spider 65, and the transmission planet gears 64 so that none can rotate relative to the others. Then, a direct drive is provided from the motor driven drive shaft 33a to the planetary spider or cage 65. The planetary reduction is locked up to make a straight one to one drive.

It should be apparent that this two-speed shift, as provided by an axially shiftable sun gear, might serve as a two-speed transmission for other purposes with either the ring gear 62 or the planetary cage 65 being the rotatable input member while the other is the output member from the transmission. However, this two-speed transmission has special utility here and coacts with the different parts of the torque proportioning means in a novel manner.

The planetary cage or spider 65 in Fig. 3 serves as a common drive between the aforedescribed two-speed gear shift planetary transmission and a torque proportioning means rotating the drive shafts 35 and 36 in Figs. 2 and 3 for rotating the front and rear wheels respectively and applying the torque to each pair of these wheels in a predetermined ratio. This torque proportioning means comprises a planetary gear unit including meshing and operatively connected sun gear 80, ring gear 81 and a plurality of arcuately spaced planet gears 82 with each of the latter rotatably supported in the common planetary web or spider 65 driven by the two-speed planetary transmission. Each planet gear 82 is of the cluster type comprising two pinions 82a, 82b of different diameters fixed to rotate together within the planetary spider 65 by stub shaft portions rotatably mounted in bearings 83, 83 in said spider 65. The larger pinion 82a meshes with the ring gear 81 while the smaller pinion 82b meshes with the sun gear 80.

The ring gear 81 and sun gear 80 respectively rotate the drive shafts 36 and 35 to drive the rear wheels 14 and front wheels 18. The ring gear 81 has gear teeth formed on its periphery to drive a gear 85 keyed to and driving the shaft 36 through suitable connecting means. The sun gear 80 is keyed to a sleeve 86 by a splined connection to drive the drive shaft 35 through the meshed bevel gears 87, 88.

It has been found desirable to divide up torque applied to the axles of the drive wheels 14 and 18 in a predetermined ratio approximately proportional to the average weight distribution on each pair of wheels. In a digging and carrying scraper of the type disclosed, approximately 60% of the torque should be applied to the rear wheels and 40% to the front wheels to obtain the torque application proportionate to the average weight distribution. The approximate ratio of 60 to 40 or any other predetermined torque ratio is determined by the force exerted by the planetary spider 65 through the planet gears 82 on the ring gear 81 and the sun gear 80. For example, a satisfactory construction for Fig. 3 would provide thirty teeth on sun gear 80, 66 teeth on ring gear 81, 15 teeth on planet gear pinions 82b and 21 teeth on planet gear pinions 82a. Since the planet gear pinions 82 are free to rotate, the reaction torques exerted in opposite direction on these planet gears by sun gear 80 and ring gear 81 must be equal. Since the torques exerted on planetary gear 82 at points A and B are equal, the forces exerted at these points are inversely proportional to the number of teeth in gear 82a and 82b respectively, so as to bear the ratio of 15 to 21. Then the torques applied to each gear 80, 81 about their common axis of rotation can be expressed in terms of the number of teeth on these gears since the pitch of all of the gears is the same. However, the force at A acts on 66 teeth while the force at B acts on 30 teeth with these teeth serving as a measure of the radius arm of each force so that the torque applied to the sun gear 80 and the front wheels with respect to the torque applied to the ring gear 81 and the rear wheels bears the ratio of approximately 39 to 61 (30/66×21/15) or approximately 40 to 60. The cluster type planet gears 82 are used so that a greater torque differential is applied to the wheels 18, 18 for a given size torque proportioning means and so that the desired ratio is obtained.

As mentioned before, the planetary cage or web 65 serves as the common planetary cage for both the two-speed planetary gear transmission and the torque proportioning means. This common spider 65 is free floating and radially supported between the sun gears 63, 80 and the ring gears 62, 81 of the transmission and torque proportioning means. Hence, this free float and radial support permits the common planetary web to rotate and to be properly supported without radial bearings. Hence the torque proportioning means readily lends itself to being driven by a two-speed input planetary of the design shown. However, it should be readily understood that the two-speed planetary transmission could take the form of a planetary drive with the motor driving either the sun gear 63 or the ring gear 62 and then the common web 65 would still be floated without requiring radial bearings. Hence, the torque proportioning means will still work in basically the same manner whether it is driven directly by the motor or whether a two-speed planetary gear shift transmission is located therebetween.

It should also be noted that the design of the unit 34 in Fig. 3 blends naturally with the demands of a digging and carrying scraper design. The motor 16 in Fig. 11 is located behind the rear wheels 14 for the previously mentioned reasons while the drive shafts 35 and 36 in Fig. 2 are angularly related to each other at approximately a 90° angle so as to be directed in the best possible directions for driving their respective wheels 18 and 14.

The scraper operator is located in the seat 104 in Figs. 1 and 2 for maximum visibility into the bowl during the loading and ejecting operations and ahead of the vehicle during forward travel. This scraper operator's station is located on the torque tube 21 of the front frame member 11 adjacent to or immediately behind and above the front steering wheels 18 but ahead of the scraper bowl 15. Vision ahead is good for driving and vision behind is good for seeing back into the bowl during scraper operation. From his seat, the operator can easily reach the steering wheel 105 for steering the front wheels 18 in the manner described in my aforementioned U.S. patent application entitled "Two-Speed Steering" or in any other suitable manner and can control the speed of the motor 16 by a manually actuated speed controller 106 in Fig. 2 or by any other suitable motor controlling means located adjacent the operator's seat 104. This remote control motor control can take the form of a pressure fluid actuated servo valve system, a flexible cable connection extending back along the housing for the front wheel drive line back to the motor throttle, etc. Hence, the scraper operator is in a position for maximum visibility while having complete control over the steering and the driving of the scraper.

Since all four wheels 14, 18 are driven and since the front wheels 18 are sometimes steered to an extreme 90°, it is sometimes desirable during steering of the scraper to reduce the drive on the rear wheels 14 to prevent excessive side skidding of the steered wheels 18 to keep from rolling the tires right off of the rims of wheels 18 and to prevent cocking the subframe part 26b about the pivot pins 30, 31 due to the forward drive of the rear wheels 14 so that only one steering wheel 18 is in contact with the ground while the other is forced out of contact. In the present disclosure, means is provided responsive to the steering angle of the steered front wheels 18 for reducing the drive of the rear wheel pair 14 during steering. Although the drive to the rear wheels may be disconnected when making a sharp turn, it has been found simpler to keep the power on the rear wheels 14 but reduce it somewhat in proportion to the angle that the vehicle is steered by gradually applying the brakes to the brake drum 90 in Fig. 5 and at the lower right in Fig. 3 so that the differential drive to the front and rear wheels permitted by the planetary construction of the torque proportioning means combined with this braking action will permit the front wheels to be driven faster than the rear wheels. Hence the steered and driven wheels 18 will turn the scraper since they are moving faster than the rear wheels 14.

Figure 5:
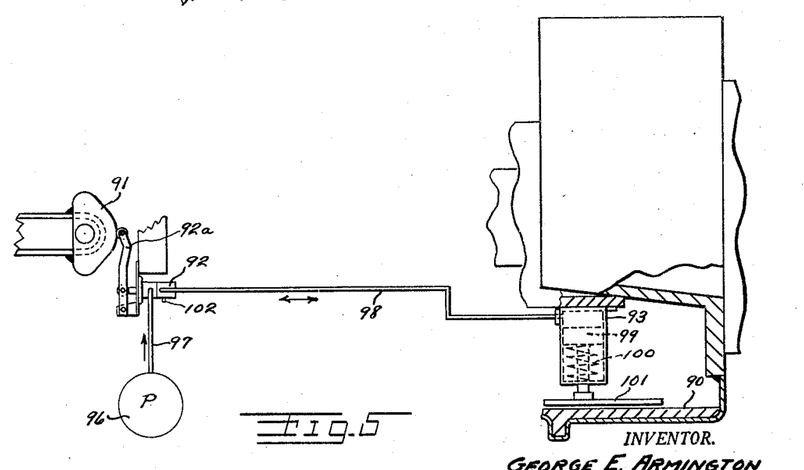
Fig. 5 is a diagrammatic view of the pressure fluid diagram for braking the rear wheel drive in response to the angle of steer of the front wheels.

Fig. 5 illustrates a fluid pressure operated circuit for performing this braking function. A cam 91, fixed to arm 26c, is rotated about the steering axis 27 by the steering frame member arm 26c so as to actuate a cam follower arm 92a on a three-way valve 92 for controlling the flow of pressure fluid to a brake cylinder 93. A pump 96 pumps fluid, such as air, into the line 97 so that when the cam 91 opens the three-way valve 92 in proportion to the steered angle, the pressure fluid will travel through flow line 98 to the single acting brake cylinder 93 to force the piston 99 downwardly against the upward force of the compression spring 100 and to clamp the brake shoe 101 against the inside surface of brake drum 90 to exert the braking effect. When the cam 91 indicates that braking is not desired, the follower arm 92a will move the three-way valve to the exhausting position so that the fluid in cylinder 93 will be forced back by spring 100 through flow line 98, valve 92, and exhaust line 102. The design of the cam 91 is such that no braking action occurs for small steering angles, but when sharp steering occurs (over 45°), the braking action is applied generally in proportion to the angular increase of steering beyond 45° so as to avoid the tendency for the scraper to move straight ahead when the front wheels 18 are steered at a sharp angle.

Braking is especially important when pivot pins 30 and 31 are provided in Fig. 1 for travel over uneven ground. If the driving effort of the rear axle is not reduced, then the front axle is tilted against limiting stops provided between the steering frame parts 26a, 26b, and the scraper bulldozes forwardly with only one wheel 18 on the ground. Hence, this braking permits both steered wheels 18 to remain in contact with the earth during turning.

Various changes in details and arrangement of parts can be made by one skilled in the art without departing from either the spirit of this invention or the scope of the appended claims.

What I claim is:

1. A self-powered four wheel drive digging and carrying scraper, comprising front and rear frame members with a pair of driving wheels supporting each frame member to provide front and rear wheels, one of said frame members carrying a scraper bowl between said pairs of wheels, means operatively connecting said frame members together for relative movement therebetween for raising and lowering said bowl, a single motor mounted on one of said frame members, and means drivingly connecting said motor and all of said wheels for driving all wheels during said relative movement between said frame members.

2. A self-powered four wheel drive digging and carrying scraper, comprising front and rear frame members with a pair of driving wheels supporting each frame member to provide front and rear wheels, said rear frame member carrying a scraper bowl between said pairs of wheels, means pivotally connecting said frame members together for relative pivotal movement therebetween for raising and lowering said bowl, a single motor mounted on said rear frame member and located behind said rear wheels for at least partially counterbalancing said bowl, and means drivingly connecting said motor and all of said wheels for driving all wheels during said relative pivotal movement between said frame members.

3. A self-powered four wheel drive digging and carrying scraper, comprising front and rear frame members with a pair of driving wheels supporting each frame member to provide front and rear wheels, said rear frame member carrying a scraper bowl between said pairs of wheels, means operatively connecting said frame members together for relative movement therebetween for raising and lowering said bowl including said front frame member having rearwardly extending arms straddling said bowl and pivotally connected thereto near the rear of said bowl, and a single motor mounted on one of said frame members for driving all wheels, the drive from said motor to the wheels on the other frame member extending from said rear frame member into close proximity with the pivotal connection between one arm and said bowl and along said arm to drivingly connect said motor with the wheels on the other frame member.

4. A self-powered four wheel drive digging and carrying scraper, comprising front and rear frame members with a pair of driving wheels supporting each frame member to provide front and rear wheels, said rear frame member carrying a scraper bowl between said pairs of wheels, means operatively connecting said frame members together for relative movement therebetween for raising and lowering said bowl including said front frame member having rearwardly extending arms straddling said bowl and pivotally connected thereto near the rear of said bowl, and a single motor mounted on one of said frame members for driving all wheels, the drive from said motor to the wheels on the other frame member extending generally transverse to said rear frame member into close proximity with the pivotal connection between one arm and said bowl, through a bevel gear drive, and along said arm to drivingly connect said motor with the wheels on the other frame member.

5. A self-powered four wheel drive digging and carrying scraper, comprising front and rear frame members with a pair of driving wheels supporting each frame member to provide front and rear wheels, one of said frame members carrying a scraper bowl between said pairs of wheels, means operatively connecting said frame members together for relative movement therebetween for raising and lowering said bowl, a single motor mounted on one of said frame members, means drivingly connecting said motor and all of said wheels for driving all wheels during said relative movement between said frame members, and means for controlling said motor located at a scraper operator's station on one of the frame members immediately adjacent the front wheels.

6. A self-powered four wheel drive digging and carrying scraper, comprising front and rear frame members with a pair of driving wheels supporting each frame member to provide front and rear wheels, said rear frame member carrying a scraper bowl between said pairs of wheels, means operatively connecting said frame members together for relative movement therebetween for raising and lowering said bowl, a single motor mounted on said rear frame member for driving all wheels and located behind said rear wheels for counterbalancing said bowl, and means operable during said relative movement between said frame members for controlling said motor located at a scraper operator's station on the front frame member immediately behind and above the front wheels.

7. A self-powered four wheel drive digging and carrying scraper, comprising front and rear frame members with a pair of driving wheels supporting each frame member to provide front and rear wheels, said rear frame members carrying a scraper bowl between said pairs of wheels, means operatively connecting said frame members together for relative movement therebetween for raising and lowering said bowl, a single motor mounted on said rear frame member and located behind said rear wheels for at least partially counterbalancing said bowl, and means drivingly connecting said motor and all of said wheels for driving all wheels during said relative movement between said frame members, said front wheels being spaced laterally closer together than the rear ones to provide more even compactness of earth traveled over.

8. A self-powered digging and carrying scraper, comprising front and rear frame members with a pair of driving wheels supporting each frame member to provide front and rear wheels, said rear frame member carrying a scraper bowl between said pairs of wheels, means operatively connecting said frame members together for relative movement therebetween for raising and lowering said bowl, a subframe pivotally connected about a generally vertical steering axis to said front frame member and having the front pair of wheels of said frame member mounted thereon for steering, said pivotal steering connection between said subframe and front frame member including axially aligned and spaced apart pivot members connecting said last mentioned frames with a clearance gap between said pivot members, a single motor mounted on said rear frame member, and means drivingly connecting said motor and said steerable wheels for driving said steerable wheels during said relative movement between said frame members, the drive from said motor to the wheels on said front frame member extending to a bevel gear drive in said clearance gap and down through at least one of said pivot members along the steering axis to said steering wheels to permit sharp steering and bowl operation without materially affecting the drive.

9. A self-powered four wheel drive digging and carrying scraper, comprising front and rear frame members with a pair of driving wheels supporting each frame member to provide front and rear wheels, said rear frame member carrying a scraper bowl between said pairs of wheels, means operatively connecting said frame members together for relative movement therebetween for raising and lowering said bowl including said front frame member having rearwardly extending arms straddling said bowl and pivotally connected thereto near the rear of said bowl, a single motor mounted on said rear frame member for driving all wheels and located behind said rear wheels for counterbalancing said bowl, and a subframe pivotally connected about a generally vertical steering axis to said front frame member and having the front pair of wheels of said frame member mounted thereon for steering, the drive from said motor to the wheels on said front frame member extending from said rear frame member into close proximity with the pivotal connection between one arm and said bowl, along said arm, and down through the steering axis to said steering wheels to permit sharp steering and bowl operation without materially affecting the drive.

10. A self-powered digging and carrying scraper, comprising front and rear frame members with a pair of wheels supporting each frame member to provide front and rear wheels, one of said frame members carrying a scraper bowl between said pairs of wheels, means operatively connecting said frame members together for relative movement therebetween for raising and lowering said bowl, a subframe pivotally connected about a generally vertical steering axis to one of said frame members and having its pair of wheels mounted thereon for steering, a single motor mounted on one of said frame members for driving said steerable wheels, the drive from said motor to the steerable wheels extending down through the steering axis to said steering wheels to permit sharp steering without materially affecting the drive, said sub-frame being formed in two parts connected by a pivotal connection with an axis of oscillation extending horizontally generally fore and aft in the straight ahead position between said pivotal steering connection with its associated frame member and said steering wheels to permit travel over uneven earth, and a universal joint means in said drive to said steering wheels and being approximately aligned with said oscillation axis to permit driving of said steering wheels while oscillating during travel over uneven ground.

11. A self-powered four wheel drive digging and carrying scraper, comprising front and rear frame members with a pair of driving wheels supporting each frame member to provide front and rear wheels, said rear frame member carrying a scraper bowl between said pairs of wheels, means operatively connecting said frame members together for relative movement therebetween for raising and lowering said bowl including said front frame member having rearwardly extending arms straddling said bowl and pivotally connected thereto near the rear of said bowl, a single motor mounted on said rear frame member for driving all wheels and located behind said rear wheels for counterbalancing said bowl, a subframe pivotally connected about a generally vertical steering axis to said front frame member and having the front pair of wheels mounted thereon for steering, said pivotal steering connection between said subframe and front frame member including axially aligned and spaced apart pivot members connecting said last mentioned frames with a clearance gap between said pivot members, said front frame member having an upwardly and forwardly extending gooseneck arch connecting the forward end of each arm and said subframe with the subframe and steering wheels extending under said arch during steering, the drive from said motor to the wheels on said front frame member extending generally transverse to said rear frame member into close proximity with the pivotal connection between one arm and said bowl, through a bevel gear drive, along said arm to a bevel gear drive in said clearance gap, and down through at least one of said pivot members along the steering axis to said steering wheels to permit sharp steering and bowl operation without materially affecting the drive, means for steering said wheels and for controlling said motor located at a scraper operator's station on the front frame member immediately behind and above the front steering wheels, said front wheels being spaced laterally closer together than the rear ones to permit 90° steering under said gooseneck arch with minimum longitudinal length to said arch and to provide more even compactness of earth traveled over, said subframe being formed in two parts connected by a pivotal connection with an axis of oscillation extending horizontally generally fore and aft in the straight ahead position between said pivotal steering connection with said front frame member and said steering wheels to permit travel over uneven earth, and a universal joint means in said drive to said steering wheels and being approximately aligned with said oscillation axis to permit driving of said steering wheels while oscillating during travel over uneven ground.

12. A vehicle, comprising a frame, one pair of both steered and motor driven wheels supporting one end of said frame, another motor driven wheel pair supporting the other end of said frame, and means operable independently of the speed of the motor driving said other wheels and responsive to the steering angle of said pair of steered wheels for reducing the driving speed of said other pair of wheels during steering so steering will properly occur without excessive side skidding of said steered wheels.

13. A vehicle, comprising a frame, one pair of both steered and driven wheels supporting one end of said frame, another driven wheel pair supporting the other end of said frame, all of said wheels being driven by a single motor on said frame through a differential drive separately to each pair of wheels, and means responsive to the steering angle of said pair of steered wheels for reducing the drive of said other pair of wheels during steering so steering will properly occur without excessive side skidding of said steered wheels, said last mentioned means including a brake means for said other pair of wheels for reducing the rotational drive thereof, said differential permitting difference in speed between said pairs of wheels so that the steered wheels will turn the vehicle.

14. A vehicle, comprising a frame, one pair of both steered and driven wheels supporting one end of said frame, another driven wheel pair supporting the other end of said frame, all of said wheels being driven by a single motor on said frame through a differential drive separately for each pair of wheels, and means responsive to the steering angle of said pair of steered wheels for reducing the drive of said other pair of wheels during steering so steering will properly occur without excessive side skidding of said steered wheels, said last mentioned means including a brake means for said other pair of wheels for reducing the rotational drive thereof with said braking means being applied generally in proportion to the angular increase of steering beyond 45°, said differential permitting difference in speed between said pairs of wheels so that the steered wheels will turn the vehicle.

15. A vehicle, comprising a frame, one pair of both steered and driven wheels supporting one end of said frame, another driven wheel pair supporting the other end of said frame, all of said wheels being driven by a single motor on said frame through a differential drive separately to each pair of wheels, a subframe pivotally connected about a generally vertical steering axis to said frame and having said one pair of wheels mounted thereon for steering, the drive from said motor to the steerable wheels extending down through the steering axis to said steering wheels to permit sharp steering without materially affecting the drive, said subframe being formed in two parts connected by a pivotal connection with an axis of oscillation extending horizontally generally fore and aft in the straight ahead position between said pivotal steering connection with said frame and said steering wheels to permit travel over uneven earth, a universal joint means in said drive to said steering wheels and being approximately aligned with said oscillation axis to permit driving of said steering wheels while oscillating during travel over uneven ground, and means responsive to the steering angle of said pair of steered wheels for reducing the drive of said other pair of wheels during steering so steering will properly occur without excessive side skidding of said steered wheels, said differential permitting difference in speed between said front and rear pairs of wheels so that the steered wheels will turn the vehicle and both steered wheels will remain in contact with the earth during turning.

16. A self-powered four wheel drive digging and carrying scraper, comprising front and rear frame members with a pair of driving wheels supporting each frame member to provide front and rear wheels, one of said frame members carrying a scraper bowl between said pairs of wheels, means operatively connecting said frame members together for relative movement therebetween for raising and lowering said bowl, a single motor mounted on one of said frame members for driving all wheels, a torque proportioning means on said one frame member driven by said motor and in turn driving said wheels with the torque applied to each pair being approximately proportional to the average weight distribution on each pair, and means drivingly connecting said torque proportioning means and the wheels on said other frame member for driving said last mentioned wheels during said relative movement between said frame members.

17. A vehicle, comprising a frame, one pair of both steered and driven wheels supporting one end of said frame, another driven wheel pair supporting the other end of said frame, a motor on said frame for driving said wheels, a torque proportioning means on said frame driven by said motor and in turn driving said wheels with the torque applied to each pair being in a definite predetermined ratio, said torque proportioning means comprising a planetary gear unit including operatively connected sun gear, ring gear and planet gear, said motor operatively driving one of said gears and each of the remaining gears driving respectively one of said wheel pairs, and means responsive to the steering angle of said pair of steered wheels for reducing the drive of said other pair of wheels during steering so steering will properly occur without excessive side skidding of said steered wheels, said last mentioned means including a brake means for said other pair of wheels for reducing the rotational drive thereof, said torque proportioning means permitting difference in speed between said pairs of wheels so that the steered wheels will turn the vehicle.

18. A vehicle, comprising a frame, two pairs of driving wheels on said frame to provide front and rear pairs of wheels therefore, a motor on said frame for driving said wheels, and a torque proportioning means on said frame driven by said motor and in turn driving said wheels with the torque applied to each pair being in a definite predetermined ratio, said torque proportioning means comprising a planetary gear unit including operatively connected sun gear, ring gear and planet gear with the latter rotatably supported in a rotatable spider with said planet gear being a cluster gear comprising two pinions of different diameters fixed to rotate together with the larger pinion meshing with said ring gear and the smaller pinion with said sun gear so that a greater torque differential is applied to said wheel pairs for a given size torque proportioning means, said motor operatively driving the spider of said planet gear and each of the remaining gears driving respectively one of said wheel pairs.

19. A vehicle, comprising a frame, two pairs of driving wheels on said frame to provide front and rear pairs of wheels therefor, a motor on said frame for driving said wheels, a torque proportioning means on said frame driven by said motor and in turn driving said wheels with the torque applied to each pair being in a definite predetermined ratio, said torque proportioning means comprising a planetary gear unit including operatively connected sun gear, ring gear and planet gear with the latter rotatably supported in a rotatable spider, said motor operatively driving the spider of said planet gear and the ring and sun gears each driving respectively one of said wheel pairs, and a planetary transmission on said frame drivingly connected between said motor and torque proportioning means planet gear spider; said gear shift transmission including a ring gear and a sun gear with one of said gears being driven by said motor, and including a planet gear operatively connected therewith and rotatably supported in said rotatable spider of said torque proportioning means so that the rotational axes of all planet gears move together.

20. A two speed vehicle, comprising a frame, two pairs of driving wheels on said frame to provide rear pairs of wheels therefor, a motor on said frame for driving said wheels, a torque proportioning means on said frame driven by said motor and in turn driving said wheels with the torque applied to each pair being in a definite predetermined ratio, said torque proportioning means comprising a planetary gear unit including operatively connected sun gear, ring gear and arcuately spaced planet gears with the latter rotatably supported in a rotatable spider, said motor operatively driving the spider of said planet gears and the ring and sun gears each driving respectively one of said wheel pairs, and a two speed gear shift planetary transmission on said frame drivingly connected between said motor and torque proportioning means planet spider to provide two driving speeds for said wheels; said gear shift transmission including a ring gear driven by said motor, including arcuately spaced planet gears operatively connected therewith and rotatably supported in said rotatable spider of said torque proportioning means, and including an axially shiftable sun gear to provide a two speed drive either by meshing with said planet gears while being locked against relative rotation with respect to said frame for permitting restrained rotation of said transmission planet gears in said spider or by meshing with both said transmission planet gears and said spider for fixing said transmission planet gears against rotation relative to said spider, said common spider being free floating and being radially supported by and between the sun gears and ring gears of the transmission and torque proportioning means.

21. A self-powered four wheel drive digging and carrying scraper, comprising front and rear frame members with a pair of driving wheels supporting each frame member to provide front and rear wheels, said rear frame members carrying a scraper bowl between said pairs of wheels, means operatively connecting said frame members together for relative movement therebetween for raising and lowering said bowl including said front frame member having rearwardly extending arms straddling said bowl and pivotally connected thereto near the rear or said bowl, a single motor mounted on said rear frame member for driving all wheels and located behind said rear wheels for counterbalancing said bowl, a torque proportioning means on said rear frame member driven by said motor and in turn driving said wheels with the torque applied to each pair being in a definite predetermined ratio approximately proportional to the average weight distribution on each pair, said torque proportioning means comprising a planetary gear unit including operatively connected sun gear, ring gear and planet gear, said motor operatively driving one of said gears and each of the remaining gears driving respectively one of said wheel pairs, a two speed gear shift planetary transmission on said frame drivingly connected between said motor and torque proportioning means to provide two driving speeds for said wheels, a subframe pivotally connected about a generally vertical steering axis to said front frame member and having the front pair of wheels of said frame member mounted thereon for steering, the drive from said motor to the wheels on said front frame member extending from said rear frame member into close proximity with the pivotal connection between one arm and bowl, along said arm, and down through the steering axis to said steering wheels to permit sharp steering and bowl operation without materially affecting the drive, means for steering said wheels and for controlling said motor located at a scraper operator's station on the front frame member immediately behind and above the front steering wheels, and means responsive to the steering angle of said front pair of steered wheels for reducing the drive of said rear pair of wheels so steering will properly occur without excessive side skidding of said steered wheels, said torque proportioning means permitting difference in speed between said front and rear pairs of wheels so that the steered wheels will turn the vehicle.

22. A vehicle construction, comprising a frame member with a pair of driving wheels supporting said frame member, a single motor mounted on said frame member for driving said wheels, a subframe pivotally connected about a generally vertical steering axis to said frame member and having the pair of wheels mounted thereon for steering, said pivotaly steering connection between said subframe and frame member including axially aligned and spaced apart pivot members connecting said frames with a clearance gap between said pivot members, said frame member having an upwardly and forwardly extending gooseneck arch with the steering wheels extending under said arch during steering, the drive from said motor to the wheels on said frame member extending to a bevel gear drive in said clearance gap and down through at least one of said pivot members along the steering axis to said steering wheels to permit sharp steering without materially affecting the drive, means for steering said wheels and for controlling said motor located at an operator's station on the frame member immediately behind and above the steering wheels, said wheels being under said gooseneck arch to give minimum longitudinal length to said arch, said subframe being formed in two parts connected by a pivotal connection with an axis of oscillation extending horizontally generally fore and aft in the straight ahead position between said pivotal steering connection with said frame member and said steering wheels to permit travel over uneven earth, and a universal joint means in said drive to said steering wheels and being approximately aligned with said oscillation axis to permit driving of said steering wheels while oscillating during travel over uneven ground.

23. A self-powered four wheel drive digging and carrying scraper, comprising front and rear frame members with a pair of driving wheels supporting each frame member to provide front and rear wheels, one of said frame members carrying a scraper bowl between said pairs of wheels, means operatively connecting said frame members together for relative movement therebetween for raising and lowering said bowl, a single motor mounted on a first one of said frame members, means drivingly connecting said motor and all of said wheels for driving all wheels during said relative movement between said frame members, and means operable during said relative movement between said members for controlling said motor from a scraper operator's station on a second one of said frame members.

24. A vehicle, comprising a frame, one pair of both steered and driven wheels supporting one end of said frame, another driven wheel pair supporting the other end of said frame, and means responsive to the steering angle of said pair of steered wheels for reducing the drive of said other pair of wheels during steering so steering will properly occur without excessive side skidding of said steered wheels, said means including a brake operable on said other driven wheel pair.

25. A vehicle, as set forth in claim 24, wherein said means includes a differential in the drive to said other driven wheel pair with said differential having two driven members and wherein said brake is adapted to reduce the driving speed of only one driven member of said differential.

26. A steerable self-powered four wheel drive digging and carrying scraper, comprising front and rear frame members with a pair of driving wheels supporting each frame member to provide front and rear wheels, one of said frame members carrying a scraper bowl between said pairs of wheels, means operatively connecting said frame members together for relative movement therebetween for raising and lowering said bowl, a sub-frame pivotally connected about a generally vertical steering axis to one of said frame members and having its pair of wheels mounted thereon for steering by movement of said sub-frame about said steering axis, a single motor mounted on one of said frame members, and means drivingly connecting said motor and all of said wheels for driving all wheels during said relative movement between said frame members and during steering movement of said sub-frame.

27. A vehicle comprising a frame, two pairs of driving wheels on said frame to provide front and rear pairs of wheels therefor, a motor on said frame for driving said wheels, and a torque proportioning means on said frame driven by said motor and in turn driving said wheels with the torque applied to each pair being in a definite predetermined ratio approximately directly proportionate to the average weight distribution on each pair with the pair supporting the larger weight having the larger torque applied thereto, said torque proportioning means including a planetary gear unit with a planet type cluster pinion gear having two different pitch diameter gear components rotatable together about a single planet axis to provide the torque proportioning action.

28. A two speed vehicle, comprising a frame, two pairs of driving wheels on said frame to provide front and rear pairs of wheels therefor, a motor on said frame for driving said wheels, a torque proportioning means on said frame driven by said motor and in turn driving said wheels with the torque applied to each pair being in a definite predetermined ratio, and a two speed gear shift transmission on said frame drivingly connected between said motor and torque proportioning means to provide two driving speeds for said wheels, both said torque proportioning means and said gear shift transmission being disposed in a common housing and including planetary gearings with a common planetary cage.

29. A vehicle, as set forth in claim 28, with the output drive of said two speed transmission being coaxially aligned with the input drive of said torque proportioning means, the output drive to the rear wheels, and the output drive to the front wheels.

References Cited in the file of this patent

UNITED STATES PATENTS

| 838,604 | Bard | Dec. 18, 1906 |
| 1,037,080 | Theillier | Aug. 27, 1912 |
| 1,132,363 | Leavitt | Mar. 16, 1915 |
| 1,273,631 | Leonard | July 23, 1918 |
| 1,293,815 | Leonard | Feb. 11, 1919 |
| 1,318,894 | Mapes | Oct. 14, 1919 |
| 1,539,417 | Huber | May 26, 1925 |
| 2,195,607 | Wilson et al. | Apr. 2, 1940 |
| 2,228,581 | Olen | Jan. 14, 1941 |
| 2,347,882 | Choate et al. | May 2, 1944 |
| 2,363,071 | LeTourneau | Nov. 21, 1944 |
| 2,406,944 | Choate et al. | Sept. 3, 1946 |
| 2,454,999 | Eaton | Nov. 30, 1948 |
| 2,500,447 | Bitzer | Mar. 14, 1950 |
| 2,507,050 | Roberts | May 9, 1950 |
| 2,574,986 | Schou | Nov. 13, 1951 |
| 2,699,073 | Flinn | Jan. 11, 1955 |

FOREIGN PATENTS

| 123,218 | Australia | Jan. 16, 1947 |

UNITED STATES PATENT OFFICE

CERTIFICATE OF CORRECTION

Patent No. 2,904,905 September 22, 1959

George E. Armington

It is hereby certified that error appears in the printed specification of the above numbered patent requiring correction and that the said Letters Patent should read as corrected below.

Column 3, line 70, for "two-spaced" read -- two-speed --; column 7, line 5, for "Fig. 11" read -- Fig. 1 --; column 8, line 50, for "carry-" read -- carrying --; column 13, line 27, for "to provide rear" read -- to provide front and rear --.

Signed and sealed this 8th day of March 1960.

(SEAL)
Attest:
KARL H. AXLINE

Attesting Officer

ROBERT C. WATSON
Commissioner of Patents